United States Patent
Schwartz (10) Patent No.: US 9,429,344 B2
(45) Date of Patent: Aug. 30, 2016

(54) ELECTROCALORIC SYSTEM WITH ACTIVE REGENERATION

(71) Applicant: Palo Alto Research Center Incorporated, Palo Alto, CA (US)

(72) Inventor: David E. Schwartz, San Carlos, CA (US)

(73) Assignee: PALO ALTO RESEARCH CENTER INCORPORATED, Palo Alto, CA (US)

(*) Notice: Subject to any disclaimer, the term of this patent is extended or adjusted under 35 U.S.C. 154(b) by 144 days.

(21) Appl. No.: 14/306,871

(22) Filed: Jun. 17, 2014

(65) Prior Publication Data

US 2015/0362225 A1    Dec. 17, 2015

(51) Int. Cl.
*F25B 21/00*    (2006.01)

(52) U.S. Cl.
CPC .......... *F25B 21/00* (2013.01); *F25B 2321/001* (2013.01)

(58) Field of Classification Search
CPC .............. F25B 21/00; F25B 2321/001; F25B 2300/00; F25B 2321/00
USPC ..................... 62/3.1, 3.2, 513, 440
See application file for complete search history.

(56) References Cited

U.S. PATENT DOCUMENTS

| | | | | |
|---|---|---|---|---|
| 5,463,868 A * | 11/1995 | Peschka | ........... | F25B 21/00 62/3.1 |
| 5,644,184 A * | 7/1997 | Kucherov | ........... | F25B 21/00 310/306 |
| 6,588,215 B1 * | 7/2003 | Ghoshal | ........... | F25B 21/00 62/3.1 |
| 6,856,037 B2 * | 2/2005 | Yazawa | ........... | F03G 7/00 257/E23.089 |
| 6,877,325 B1 * | 4/2005 | Lawless | ........... | F25B 21/00 62/3.1 |
| 8,174,245 B2 * | 5/2012 | Carver | ........... | H01L 37/00 136/201 |
| 2004/0015058 A1 * | 1/2004 | Besson | ........... | A61B 5/14552 600/301 |
| 2008/0303375 A1 | 12/2008 | Carver | | |
| 2010/0242498 A1 * | 9/2010 | Powell | ........... | F25B 21/00 62/3.1 |
| 2011/0001389 A1 * | 1/2011 | Carver | ........... | H01L 37/00 310/306 |
| 2011/0146308 A1 | 6/2011 | Casasanta | | |
| 2011/0316385 A1 * | 12/2011 | Erbil | ........... | H01L 37/02 310/306 |
| 2013/0067935 A1 | 3/2013 | Kruglick | | |

OTHER PUBLICATIONS

Gu et al., "A Chip Scale Electrocaloric Effect Based Cooling Device", Applied Physics Letters 102, 2013, 4 pages.

* cited by examiner

*Primary Examiner* — Mohammad M Ali
(74) *Attorney, Agent, or Firm* — Hollingsworth Davis, LLC (57) ABSTRACT

An electrocaloric with active regeneration includes first and second electrocaloric capacitors proximate one another enabling heat transfer there between. In the system, complementary first and second electric fields are applied to their respective electrocaloric capacitors such that when the electric fields are applied the temperature of the first electrocaloric capacitor increases while the temperature of the second electrocaloric capacitor decreases or vice-versa. Shifting of one or both of the electrocaloric capacitors relative to one another assists in heat transfer between the two and may additionally transfer heat from an object to be cooled, which is connected to the first electrocaloric capacitor, to a heat sink, which is connected to a second electrocaloric capacitor.

22 Claims, 7 Drawing Sheets

ELECTROCALORIC SYSTEM WITH ACTIVE REGENERATION

TECHNICAL FIELD

The present disclosure is directed to electrocaloric cooling and/or heating, and, more particularly, electrocaloric cooling and/or heating with active regeneration.

BACKGROUND

The electrocaloric effect (ECE) and the pyroelectric effect refer to the same phenomenon: a change in the temperature of a material associated with a changing electric field. When a material is used in a cooling or refrigeration application, the term "electrocaloric" is generally used. When a material is used for generating electricity or mechanical work from heat (i.e., as a heat engine), the term "pyroelectric" is used.

Certain materials, notably polymers and co-polymers based on P(VDF-TrFE) and ceramic materials such as lead zirconate titanate (PZT), have been shown to have a large ECE. These materials can be used to effect refrigeration by moving heat from a lower to a higher temperature. They can also be used as heat engines by extracting charge associated with the differential in electrical displacement at different temperatures.

To use a material that exhibits ECE (an "EC material") in a cooling device, the temperature changes induced by applying electric fields can be synchronized with some means of creating directionality in the heat flux such that heat is extracted from one side of the device and delivered to another. One means of doing this is with thermal switches that alternately create high thermal conductance paths on either side of an EC capacitor. Another means is with regeneration.

SUMMARY

An electrocaloric system with active regeneration includes first and second electrocaloric capacitors proximate one another enabling heat transfer there between. In the system, complementary first and second electric fields are applied to their respective electrocaloric capacitors such that when the electric fields are applied the temperature of the first electrocaloric capacitor increases while the temperature of the second electrocaloric capacitor decreases or vice-versa. Physically displacing the electrocaloric capacitors relative to one another assists in heat transfer between the two and may additionally transfer heat from an object to be cooled, which is connected to the first electrocaloric capacitor, to a heat sink, which is connected to a second electrocaloric capacitor.

The electrocaloric system with active regeneration may further comprise stacks of alternately paired first and second electrocaloric capacitors where motion of like electrocaloric capacitors occurs substantially synchronously. Each electrocaloric capacitor may have a single layer parallel-plate capacitor structure, in which the dielectric layer is a material capable of an electrocaloric effect, a multilayer capacitor structure comprising a stack of such single layers, or a different capacitor structure. The motion of the electrocaloric capacitors may be induced through use of an actuator. The motion and the fields applied to the electrocaloric capacitors may occur intermittently or continuously. The motion may be linear or rotational. The heat source and the heat sink may be directly coupled to the electrocaloric capacitors or may be coupled via liquid heat exchange coupling or a solid heat exchange coupling.

A method for electrocaloric cooling via active regeneration includes moving a second electrocaloric capacitor in a first direction relative to a first electrocaloric capacitor. It also includes increasing an electric field on the first electrocaloric capacitor while keeping a low electric field on the second electrocaloric capacitor whereby heat is transferred from the first elector caloric capacitor to the second electrocaloric capacitor. It further includes moving the second electrocaloric capacitor in a direction opposite the first direction relative to the first electrocaloric capacitor. And, also includes increasing an electric field on the second electrocaloric capacitor while keeping a low electric field on the first electrocaloric capacitor whereby heat is transferred from the second electrocaloric capacitor to the first electrocaloric capacitor.

The method may additionally comprise coupling the first electrocaloric capacitor to a heat source and coupling the second electrocaloric capacitor to a heat sink. The motion of the second electrocaloric capacitor and the adjustment of the electric fields may be performed intermittently or continuously.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Figure 1A:
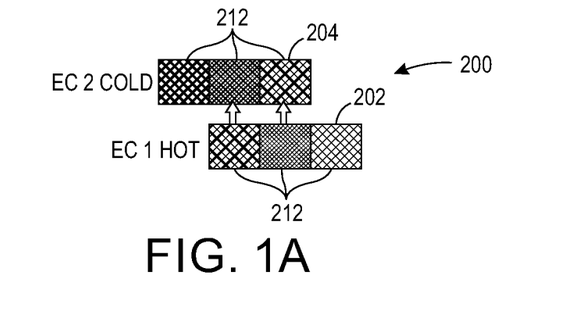
FIGS. 1(a)-1(c) illustrate a system for electrocaloric cooling via active regeneration in accordance with various embodiments disclosed herein.
Figure 1B:
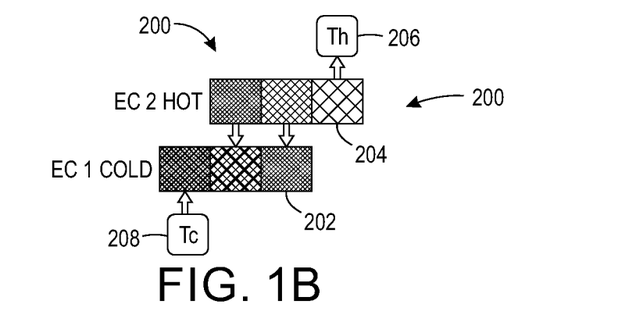
Figure 1C:
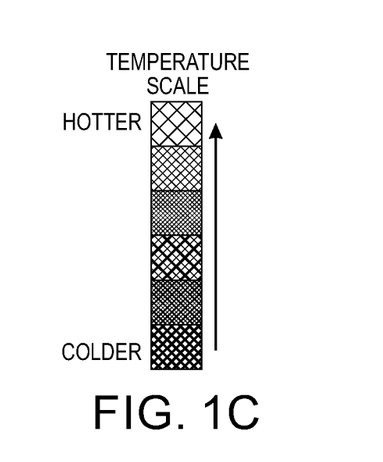

Referring now to FIGS. 1(a)-1(c), a schematic illustrating a system 200 for electrocaloric cooling via active regeneration may be appreciated. The system 200 provides a first EC capacitor 202 and a second EC capacitor 204. The electric fields applied to this second EC capacitor 204 are complementary to the electric fields applied to the first EC capacitor 202 so that the temperature of the second EC capacitor 204 increases while the temperature of the first EC capacitor 202 decreases, and vice-versa. Note that FIG. 1(c) provides a temperature scale to aid in interpreting the temperatures across each of the EC capacitors 202 and 204 during various system phases. It should be noted that while FIGS. 1(a)-1(c) illustrate discrete sections within each of capaciators 202 and 204, the sections may indeed be of different EC materials tuned to work optimally at different temperatures or the sections may be of homogeneous EC material with the sections illustrating the temperature gradient across the homogeneous EC material.

FIG. 1(a) illustrates the regeneration phase of the system 200. During the regeneration phase, the first EC capacitor 202 is relatively hot (a high electric field is being applied) while the second EC capacitor 204 is relatively cold (a low electric field is being applied). Heat is transferred from the first EC capacitor 202 to the second EC capacitor 204. Note that each of the first and second EC capacitors 202 and 204 comprises a plurality electrocaloric materials 212. In the present configuration, the plurality of electrocaloric materials 212 are in a series, or side-by-side, orientation, however, the electrocaloric materials may also be layered or otherwise intermixed to produce a desired electrocaloric capacitor with desired electrocaloric function.

FIG. 1(b) illustrates the heat transfer phase of the system 200. During the heat transfer phase, the second EC capacitor 204 has been shifted, or displaced, relative to the fixed position of the first EC capacitor 202; either or both of the EC capacitors 202 and 204 may be displaced as appropriate to a specific application. Further, during the heat transfer phase, the second EC capacitor 204 is relatively hot (a high electric field is being applied) while the first EC capacitor 202 is relatively cold (a low electric field is being applied) so heat is transferred from the second EC capacitor 204 to the first EC capacitor 202. Additionally, in the heat transfer phase, the hot side of the second EC capacitor 204 is in contact with a heat sink 206 at a hot temperature, $T_h$, and the cold side of the first EC capacitor 202 is in contact with the object 208 to be cooled at a cold temperature, $T_c$, wherein $T_c < T_h$. The vertically-oriented arrows in FIGS. 1(a) and 1(b) indicate the direction of heat flow. It should be noted that the temperatures of the two capacitors 202 and 204 are not constant; there is a temperature gradient across each of capacitors 202 and 204 at all times, i.e., hotter on the right and cooler on the left.

Figure 2A:
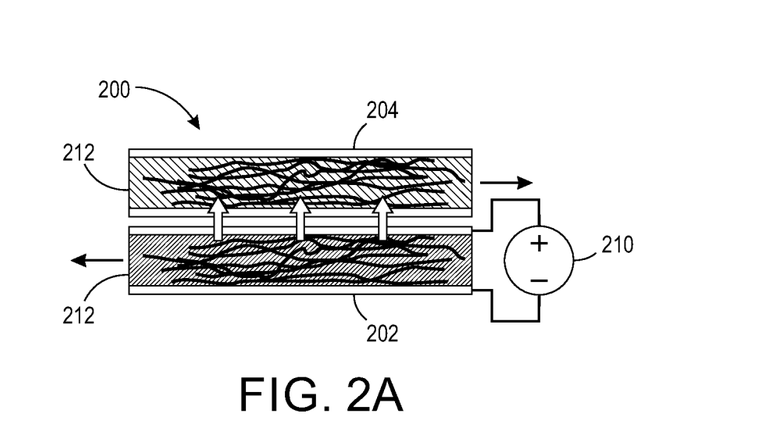
FIGS. 2(a)-2(b) illustrate a system for electrocaloric cooling via active regeneration in accordance with various embodiments disclosed herein.
Figure 2B:
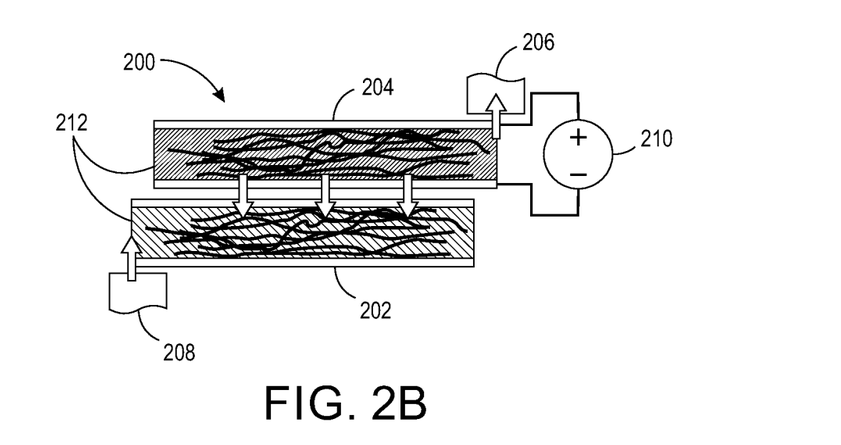

FIGS. 2(a) and 2(b) similarly illustrate system 200 with first EC capacitor 202 and second EC capacitor 204. FIG. 2(a) illustrates the regeneration phase of the system 200 with a voltage source 210 applying a high electric field to the first EC capacitor 202 while the second EC capacitor 204 is submitted to a low electric field, indicated by the absence of a voltage source, keeping the second EC capacitor 204 relatively cool. Side arrows indicate displacement motion of the EC capacitor(s) 202 and 204; either or both may be displaced. Vertically-oriented arrows indicate the direction of heat transfer from the first EC capacitor 202 to the second EC capacitor 204.

FIG. 2(b) illustrates the heat transfer phase of the system 200 wherein a high electric field, generated by voltage source 210, is applied to the second EC capacitor 204 and a low electric field, indicated by absence of a voltage source, is applied to the first capacitor 202. Heat sink 206 is again provided to the hot side of the second EC capacitor 204 and an object 208 to be cooled is again provided to the cold side of the first EC capacitor 202. The vertically-oriented arrows once again indicate the direction of heat transfer. FIGS. 2(a) and 2(b) further emphasize that each of the EC capacitors is fabricated from one or more EC materials 212 which may comprise an electrocaloric polymer, an electrocaloric co-polymer and/or an electrocaloric ceramic. Polymers generally have a low elastic modulus while ceramics can be brittle. As such, it may be necessary to reinforce the EC capacitors with metal foil or other supportive material.

The electrocaloric cooling via active regeneration system 200 of FIGS. 1 and 2 is a four stage cycle: (1) move one direction, e.g., move the second EC capacitor 204 to the left relative to the first EC capacitor 202; (2) increase the first of the two electric fields while keeping the other low, e.g., increase the electric field on the first EC capacitor 202; (3) move the other direction, e.g., move the second EC capacitor 204 to the right relative to the first EC capacitor 202; and (4) increase the second of the two electric field while keeping the other low, e.g., increase the electric field on the second EC capacitor 204. Each of the steps provides discrete motion and field changes; however, the system 200 may also be continuous.

Figure 3A:
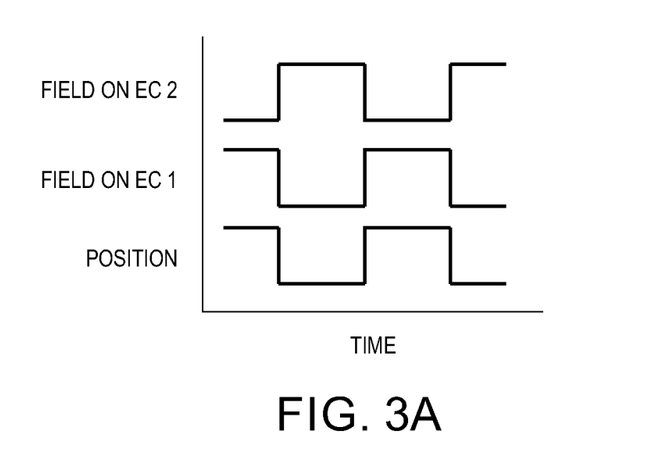
FIGS. 3(a)-3(b) illustrate examples of waveforms that may be associated with the system for electrocaloric cooling via active regeneration in accordance with various embodiments disclosed herein.
Figure 3B:
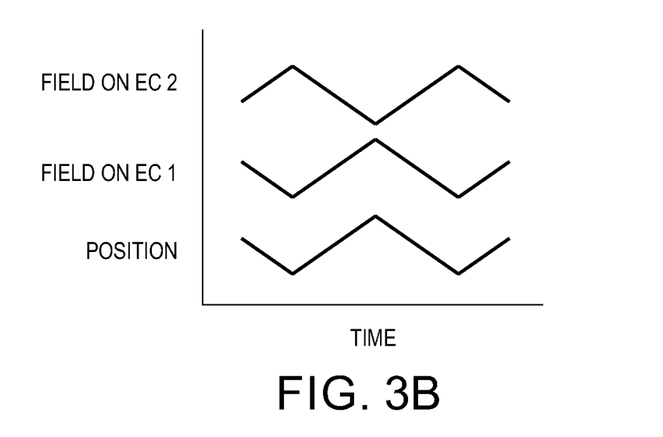

FIG. 3(a) depicts the waveforms associated with discrete motion and field changes and specifically illustrates the position, the electric field on the first EC capacitor 202, and the electric field on the second EC capacitor 204 relative to time. FIG. 3(b) depicts the waveforms associated with continuous motion and field changes and specifically illustrates the position, the electric field on the first EC capacitor 202, and the electric field on the second EC capacitor 204 relative to time. While FIG. 3(b) depicts a ramp waveform, it should be noted that other types of continuous waveforms, e.g., sinusoidal, are also possible as long as the system 200 is properly synchronized.

Figure 4A:
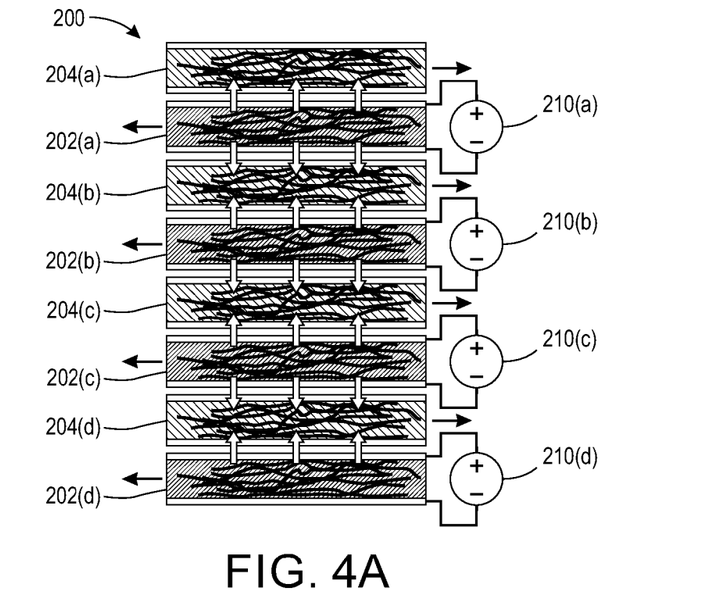
FIGS. 4(a)-4(b) illustrate a system for electrocaloric cooling via active regeneration incorporating a plurality of stacked electrocaloric capacitors in accordance with various embodiments disclosed herein.
Figure 4B:
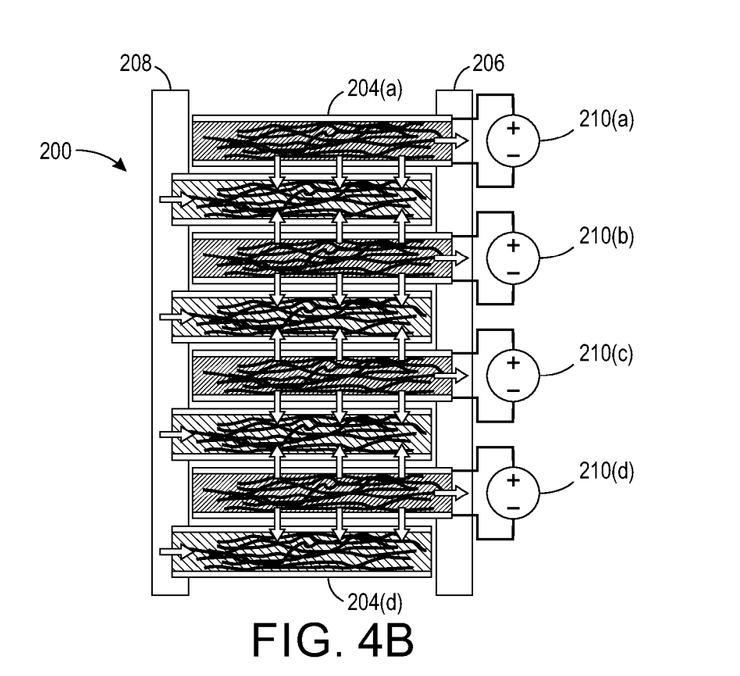

While FIGS. 1 and 2 have illustrated an example embodiment of the system 200 with only two EC capacitor layers (202 and 204), in practice, many layers of EC capacitors may be stacked. FIGS. 4(a) and 4(b) depict an example embodiment of system 200 where a plurality of first EC capacitors, e.g., 202 (a)-(d), are alternately layered with a plurality of second EC capacitors 204 (a)-(d). Once again, side arrows indicate the direction of motion and vertically-oriented arrows indicate the direction of heat transfer. The heat sink 206 and the object 208 to be cooled are also incorporated in the configuration of FIG. 4(b). Any number of EC capacitor layers may be used as suitable to a specific application.

The motion of one or both of the EC capacitors 202 and 204 may be achieved with a motor or other actuator. In the case of stacked EC capacitors, the alternate EC capacitor layers may be attached to one another to provide substantially uniform and simultaneous movement. To enable good thermal contact between EC capacitor layers, and to reduce friction during motion, a layer of lubrication may be provided intermediate each EC capacitor layer. The lubricant may comprise a thermally conductive oil or, alternatively, may comprise any other suitable oil or liquid lubricant and/or a solid lubricant such as graphite, or an oil containing particles of thermally-conductive or thermally-insulating materials. The length of motion (or displacement distance) for the EC capacitance layers, the EC capacitance layer thickness, the electric field generating voltage, etc. are dependent on material and system choices and can thus be selected appropriate to a specific application.

Figure 5A:
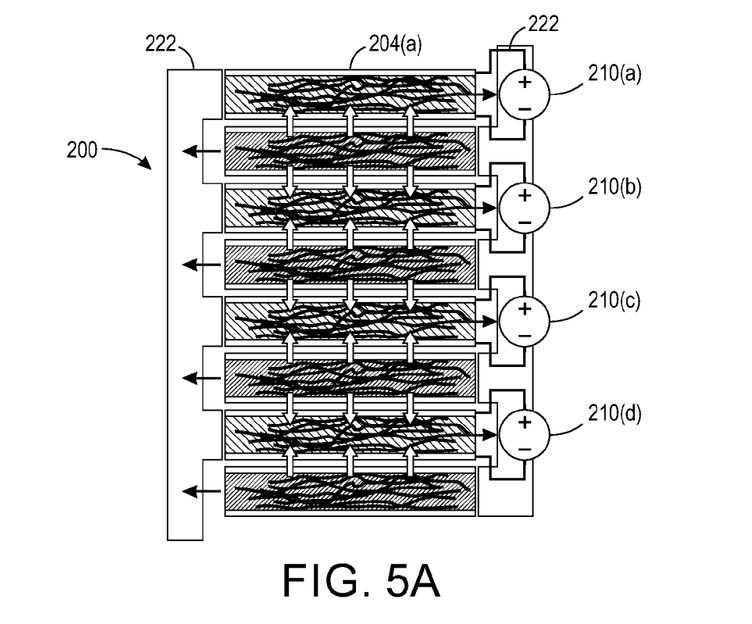
FIGS. 5(a)-5(b) illustrate a system for electrocaloric cooling via active regeneration incorporating solid coupling blocks in accordance with various embodiments disclosed herein.
Figure 5B:
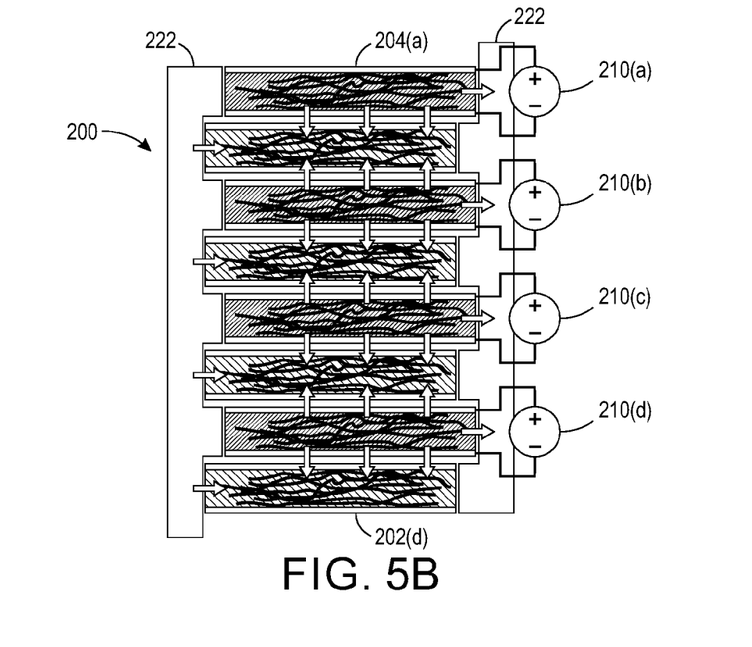

The heat sink 206 and the object 208 to be cooled may be connected to the system 200 in any manner suitable to a specific application. For example, the heat sink 206 and the object 208 may be connected to the system 200 through a liquid loop or other pumped liquid cooling. In another example embodiment, solid coupling such as in the form of metal blocks 222 may be used. See FIG. 5(a) where the EC capacitor layers 202 and 204 are positioned proximate metal blocks 222 and FIG. 5(b) where motion has caused EC capacitors to be in heat transfer contact with the metal blocks 222. The metal blocks 222 may, in turn, be coupled to the heat sink and the object to be cooled and/or an air heat exchanger or liquid loop, etc. While examples of system 200 connectors have been described herein, any other suitable heat exchange mechanism may be used to connect to the system 200.

Figure 6A:
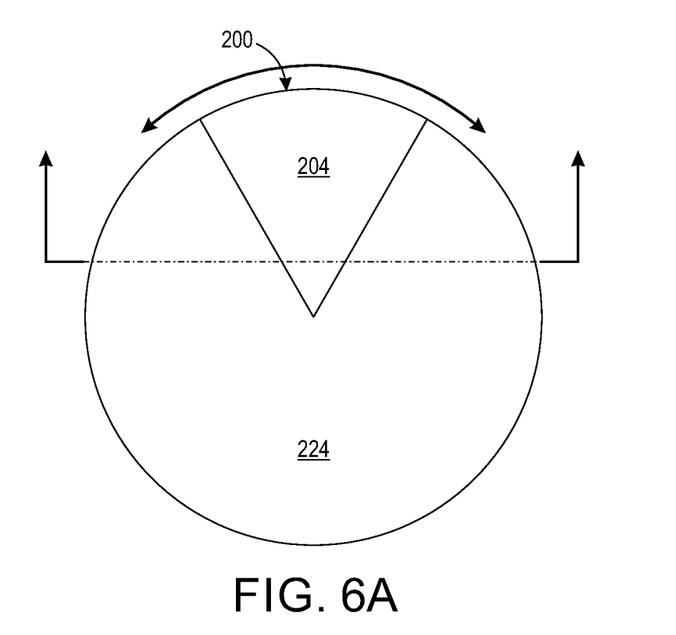
FIGS. 6(a)-6(b) illustrate an alternate configuration of a system for electrocaloric cooling via active regeneration in accordance with various embodiments disclosed herein.
Figure 6B:
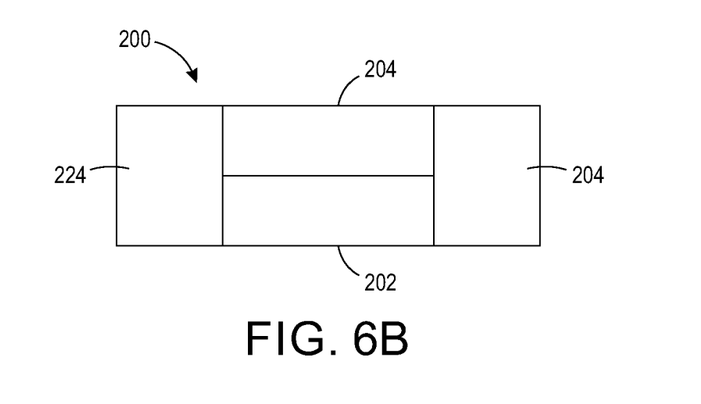

While the above disclosure has focused on linearly configured EC capacitors having linear reciprocal motion, it should be noted that the EC capacitors and their motion need not be linear or reciprocal. For example, the EC capacitors may be parts of disks, e.g., a wedge, half-disk, etc., and the motion may be rotational. See FIG. 6(a) which illustrates system 200 in a wedge configuration within a heat transfer material 224 where rotational motion is enabled. FIG. 6(b) is a sectional view of FIG. 6(a) illustrating the first EC capacitor 202 and the second EC capacitor 204, which is capable of rotational motion relative to the first EC capacitor 202.

The various embodiments of the system 200 described herein may provide the advantage of higher power density and/or higher temperature lift through more active material volume as well as higher efficiency through more effective heat transfer.

The core system described above may alternatively be configured as a pyroelectric heat engine. In the pyroelectric heat engine configuration, a pyroelectric material is substituted for the electrocaloric material. The pyroelectric material is selected to optimize heat energy harvesting. In contrast to the cooling configuration described above, heat is absorbed by the device at the hot side and rejected at the cold side. The high voltage supplies of the cooling configuration are replaced by loads in the heat engine configuration. The loads may be passive or active with impedances or voltages synchronized with the motion of the capacitors.

Figure 7A:
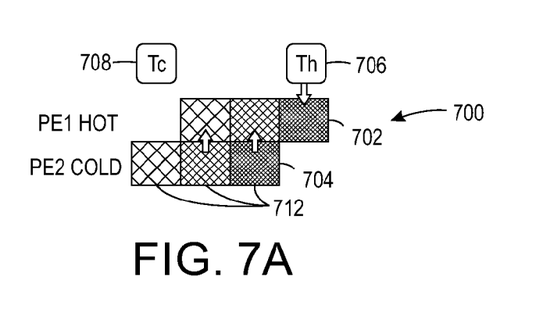
FIGS. 7(a)-7(c) illustrate a system for pyroelectric energy harvesting with active regeneration in accordance with various embodiments disclosed herein.
Figure 7B:
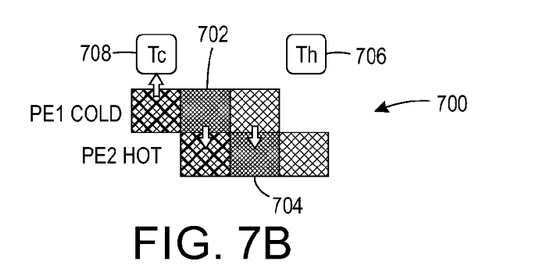
Figure 7C:
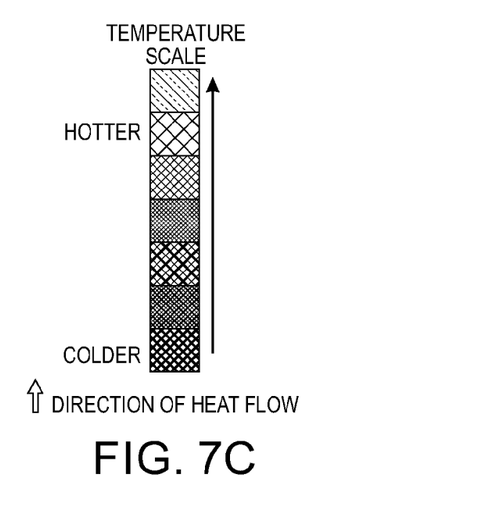

FIGS. 7(a)-7(c), illustrate a system 700 for pyroelectric power generation with active regeneration. The system 700 provides a first pyroelectric (PE) capacitor 702 and a second PE capacitor 704. A heat source 706 and a heat sink 708 are also provided. Note that FIG. 7(c) provides a temperature scale to aid in interpreting the temperatures across each of the PE capacitors 702 and 704 during various system phases. It should be noted that while FIGS. 7(a)-7(c) illustrate discrete sections within each of capacitors 702 and 704, the sections may indeed be of different PE materials tuned to work optimally at different temperatures or the sections may be of homogeneous PE material with the sections illustrating the temperature gradient across the homogeneous PE material.

FIG. 7(a) illustrates one phase of a thermodynamic cycle within the pyroelectric heat engine. PE capacitor 702 is moved so that its hotter side is in communication with the heat source 706 while its voltage decreased such that it absorbs heat. At the same time, PE capacitor 704, which is in communication with PE capacitor 702, has its voltage increased so that it rejects heat to the PE capacitor 702. In the second phase, per FIG. 7(b), PE capacitor 702 is moved so that its colder side is in communication with the heat sink 708. Its voltage is increased so that it rejects heat to the heat sink 708 as well as to PE capacitor 704, which has its voltage decreased. Because of the pyroelectric effect, the net electrical energy in terms of charge times voltage put into the system per cycle is less than the energy extracted. In this way, the device operates as a heat engine. Other configurations of pyroelectric capacitors, heat sources, and heat sinks are possible, and other pyroelectric energy harvesting cycles are also possible.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

The invention claimed is:

1. A system comprising:
a first electrocaloric capacitor; and
a second electrocaloric capacitor proximate the first electrocaloric capacitor wherein the proximity enables heat transfer between the first and second electrocaloric capacitors,
wherein a first electric field is applied to the first electrocaloric capacitor and a second electric field is applied to the second electrocaloric capacitor, and
wherein the first and second electric fields are complementary such that when the first and second electric fields are applied to their respective electrocaloric capacitors the temperature of the first electrocaloric capacitor rises in accordance with a rising first electric field and the temperature of the second electrocaloric capacitor decreases in accordance with a decreasing second electric field or the temperature of the first electrocaloric capacitor decreases in accordance with a decreasing first electric field and the temperature of the second electrocaloric capacitor increases in accordance with a rising second electric field.

2. The system of claim 1, wherein one or both of the first and second electrocaloric capacitors are shifted intermittently or continuously relative to one another in correspondence with the raising and lowering of the first and second electric fields.

3. The system of claim 1, wherein one of the first or second electrocaloric capacitors is coupled to a heat source and the other of the first or second electrocaloric capacitors is coupled to a heat sink.

4. The system of claim 1, further comprising a lubricant intermediate the first electrocaloric capacitor and the second electrocaloric capacitor.

5. The system of claim 1, wherein the first and/or second electrocaloric capacitors comprise a plurality of electrocaloric materials.

6. The system of claim 5, wherein the plurality of electrocaloric materials are in a series configuration and/or a layer configuration.

7. The system of claim 1, further comprising a plurality of first and second electrocaloric capacitors stacked in an alternating pair configuration of first electrocaloric capacitor and a second electrocaloric capacitor.

8. The system of claim 7, wherein one or both of like electrocaloric capacitors in the alternating pair configuration are substantially synchronously shifted.

9. The system 8, wherein the substantially synchronous shifting occurs intermittently or continuously in correspondence with the raising and lowering of the first and second electric fields.

10. The system of claim 2, wherein the shifting is caused by an actuator.

11. The system of claim 2, wherein the shifting comprises linear or rotational motion.

12. A system comprising:
a first electrocaloric capacitor; and
a second electrocaloric capacitor proximate the first electrocaloric capacitor wherein the proximity enables heat transfer between the first and second electrocaloric capacitors,
wherein a first electric field is applied to the first electrocaloric capacitor and a second electric field is applied to the second electrocaloric capacitor, and
wherein the first and second electric fields are complementary such that when the first and second electric fields are applied to their respective electrocaloric capacitors the temperature of the first electrocaloric capacitor rises in accordance with a rising first electric field and the temperature of the second electrocaloric capacitor decreases in accordance with a decreasing second electric field or the temperature of the first electrocaloric capacitor decreases in accordance with a decreasing first electric field and the temperature of the second electrocaloric capacitor increases in accordance with a rising second electric field, and
wherein one or both of the first and second electrocaloric capacitors are shifted relative to one another in correspondence with the raising and lowering of the first and second electric fields.

13. The system of claim 12, wherein the shifting of the first and second electrocaloric capacitors occurs intermittently or continuously.

14. The system of claim 12, wherein one of the first or second electrocaloric capacitors is coupled to a heat source and the other of the first or second electrocaloric capacitors is coupled to a heat sink.

15. The system of claim 12, further comprising a lubricant intermediate the first electrocaloric capacitor and the second electrocaloric capacitor.

16. The system of claim 12, wherein the first and/or second electrocaloric capacitors comprise a plurality of electrocaloric materials.

17. The system of claim 16, wherein the plurality of electrocaloric materials are in a series configuration and/or a layer configuration.

18. The system of claim 12, further comprising a plurality of first and second electrocaloric capacitors stacked in an alternating pair configuration of first electrocaloric capacitor and a second electrocaloric capacitor.

19. The system of claim 18, wherein one or both of like electrocaloric capacitors in the alternating pair configuration are substantially synchronously shifted.

20. The system of claim 12, wherein the shifting comprises linear motion or rotational motion.

21. A method of cooling comprising:
moving a second electrocaloric capacitor a first direction relative to a first electrocaloric capacitor;
increasing an electric field on the first electrocaloric capacitor while lowering an electric field on the second electrocaloric capacitor whereby heat is transferred from the first electrocaloric capacitor to the second electrocaloric capacitor;
moving the second electrocaloric capacitor in a direction opposite the first direction relative to the first electrocaloric capacitor; and
increasing an electric field on the second electrocaloric capacitor while lowering an electric field on the first electrocaloric capacitor whereby heat is transferred from the second electrocaloric capacitor to the first electrocaloric capacitor.

22. A system comprising:
a first pyroelectric capacitor; and
a second pyroelectric capacitor proximate the first pyroelectric capacitor wherein the proximity enables heat transfer between the first and second pyroelectric capacitors,
wherein a first voltage is applied to the first pyroelectric capacitor and a second voltage is apply to the second pyroelectric capacitor, and
wherein the first and second voltages are complementary such that when the first and second voltages are applied to their respective pyroelectric capacitors the temperature of the first pyroelectric capacitor increases in accordance with a decreasing first voltage and the temperature of the second pyroelectric capacitor decreases in accordance with an increasing second voltage or the temperature of the first pyroelectric capacitor decreases in accordance with an increasing first voltage and the temperature of the second pyroelectric capacitor increases in accordance with a decreasing second voltage.

* * * * *